US009648027B2

(12) United States Patent
Wang et al.

(10) Patent No.: US 9,648,027 B2
(45) Date of Patent: *May 9, 2017

(54) SEGMENT AUTHENTICATION FOR DYNAMIC ADAPTIVE STREAMING

(71) Applicant: Futurewei Technologies, Inc., Plano, TX (US)

(72) Inventors: Xin Wang, Rancho Palos Verdes, CA (US); Yongliang Liu, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/066,759

(22) Filed: Mar. 10, 2016

(65) Prior Publication Data

US 2016/0197939 A1 Jul. 7, 2016

Related U.S. Application Data

(63) Continuation of application No. 13/731,864, filed on Dec. 31, 2012, now Pat. No. 9,348,993.

(Continued)

(51) Int. Cl.
| | |
|---|---|
| *H04L 29/06* | (2006.01) |
| *G06F 21/44* | (2013.01) |
| *G06F 21/10* | (2013.01) |
| *H04N 21/258* | (2011.01) |
| *H04N 21/835* | (2011.01) |

(Continued)

(52) U.S. Cl.
CPC ............ *H04L 63/123* (2013.01); *G06F 21/10* (2013.01); *G06F 21/44* (2013.01); *H04L 65/602* (2013.01); *H04N 21/25816* (2013.01); *H04N 21/26258* (2013.01); *H04N 21/64322* (2013.01); *H04N 21/835* (2013.01); *H04N 21/8352* (2013.01);

(Continued)

(58) Field of Classification Search
CPC .......... G06F 21/00; G06F 21/10; G06F 21/30; G06F 21/44; G06F 21/60; G06F 21/64; H04N 21/25816; H04N 21/835; H04N 21/8352; H04N 21/84; H04N 21/8456; H04N 21/85406; H04N 21/26258; H04N 21/64322; H04L 63/123
USPC .......................................................... 726/4
See application file for complete search history.

(56) References Cited

U.S. PATENT DOCUMENTS

| | | | |
|---|---|---|---|
| 2004/0153648 A1* | 8/2004 | Rotholtz | .................. H04N 7/18 713/176 |
| 2010/0023815 A1* | 1/2010 | Hasegawa | ............... G06F 21/64 714/57 |
| 2010/0146287 A1 | 6/2010 | Kreiner et al. | |

OTHER PUBLICATIONS

Sodagar, Ira J, "MPEG-DASH, ISO/IEC 23009-1, Dynamic Adaptive Streaming Over HTFP, A Short Tutorial," Sep. 21, 2011.*

(Continued)

*Primary Examiner* — Yogesh Paliwal
(74) *Attorney, Agent, or Firm* — Conley Rose, P.C.

(57) ABSTRACT

A method including generating a segment signature for a segment of a media content based on the segment, trusted information contained in a media presentation description (MPD), and a signature signing key, wherein the MPD describes the media content, wherein the segment signature is independent of other segment signatures corresponding to other segments of the media content, and wherein a single copy of the segment signature is configured to be transmitted to a client requesting the segment of the media content thereby permitting the client to determine authenticity of the segment without receiving any additional segment signatures.

15 Claims, 4 Drawing Sheets

Related U.S. Application Data

(60) Provisional application No. 61/707,657, filed on Sep. 28, 2012.

(51) Int. Cl.
*H04N 21/8352* (2011.01)
*H04N 21/84* (2011.01)
*H04N 21/845* (2011.01)
*H04N 21/854* (2011.01)
*H04N 21/262* (2011.01)
*H04N 21/643* (2011.01)

(52) U.S. Cl.
CPC ......... *H04N 21/84* (2013.01); *H04N 21/8456* (2013.01); *H04N 21/85406* (2013.01)

(56) References Cited

OTHER PUBLICATIONS

"Information technology-Dynamic adaptive streaming over HTTP (DASH)-Part 1: Media presentation discription and segment formats," ISO/IEC 23009-1:2012(E), ISO/IEC JTC 1/SC 29/WG 11, International Standard, STD Version 2.1c2, Jan. 5, 2012, 133 pgs.
Giladi, A., Ed., et al., "Study of ISO/IEC DIS 23009-4 Segment encryption and authentication," International Organisation for Standardisation, ISO/IEC JTC1/SC291WG11, Coding of Moving Pictures and Audio, MPEG2012/w13088, Oct. 2012, Shanghai, China, 36 pgs.
Liu, Y. et al., "On Improving Segment Authentication for Dynamic Adaptive Streaming," International Organisation for Standardisation, ISO/IEC JTC1/SC29/WG11, Coding of Moving Pictures and Audio, MPEG2012/m26931, Oct. 2012, Shanghai, China, 3 pgs.
Sodagar, L, "Dynamic Adaptive Streaming over HTTP a Short Tutorial," MPEG-DASH ISO/IEC 23009-1, Sep. 2011, 35 pgs.
Office Action dated Aug. 28, 2014, 11 pgs., U.S. Appl. No. 13/731,864, filed Dec. 31, 2012, 4194-67001.
Office Action dated Feb. 2, 2015, 11 pgs., U.S. Appl. No. 13/731,864, filed Dec. 31, 2012, 4194-67001.
Office Action dated Jun. 11, 2015, 14 pgs., U.S. Appl. No. 13/731,864, filed Dec. 31, 2012, 4194-67001.
Office Action dated Dec. 3, 2015, 9 pgs., U.S. Appl. No. 13/731,864, filed Dec. 31, 2012, 4194-67001.
Notice of Allowance dated Dec. 31, 2012, 5 pgs., U.S. Appl. No. 13/731,864, filed Dec. 31, 2012, 4194-67001.

* cited by examiner

SEGMENT AUTHENTICATION FOR DYNAMIC ADAPTIVE STREAMING

CROSS-REFERENCE TO RELATED APPLICATIONS

The present application is a continuation of U.S. patent application Ser. No. 13/731,864 filed Dec. 31, 2012 by Xin Wang, et al., and entitled "Segment Authentication for Dynamic Adaptive Streaming," which claims priority to U.S. Provisional Patent Application No. 61/707,657 filed Sep. 28, 2012, by Xin. Wang, et al., and entitled "Segment Authentication for Dynamic Adaptive Streaming," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A media content provider or distributor may deliver various media contents to subscribers or users using different coding schemes suited for different devices, such as televisions, notebook computers, and mobile handsets. The media content provider may support a plurality of media encoder and/or decoders (codecs), media players, video frame rates, spatial resolutions, bit-rates, video formats, or combinations thereof. A media content may be converted from a source or original representation to various other representations to suit the different user devices.

A media content may comprise a media presentation description (MPD) and a plurality of segments. The MPD may be an extensible markup language (XML) file or document describing the media content, such as its various representations, uniform resource locator (URL) addresses, and other characteristics. For example, the media content may comprise several media components (e.g. audio, video, and text), each of which may have different characteristics that are specified in the MPD. Each media component comprises a plurality of segments containing the parts of actual media content, and the segments may be stored collectively in a single file or individually in multiple files. Each segment may contain a pre-defined byte size (e.g., 1,000 bytes) or an interval of playback time (e.g., 2 or 5 seconds) of the media content.

Depending on the application, the media content may be divided into various hierarchies. For example, the media content may comprise multiple periods, where a period is a time interval relatively longer than a segment. For instance, a television program may be divided into several 5-minute-long program periods, which are separated by several 2-minute-long commercial periods. Further, a period may comprise one or multiple adaptation sets (AS). An AS may provide information about one or multiple media components and its/their various encoded representations. For instance, an AS may contain different bit-rates of a video component of the media content, while another AS may contain different bit-rates of an audio component of the same media content. A representation may be an encoded alternative of a media component, varying from other representations by bit-rate, resolution, number of channels, or other characteristics, or combinations thereof. Each representation comprises multiple segments, which are media content chunks in a temporal sequence. Moreover, sometimes to enable downloading a segment in multiple parts, sub-segments may be used each having a specific duration and/or byte size. One skilled in the art will understand the various hierarchies that can be used to deliver a media content.

In adaptive streaming, when delivering a media content to a user device, the user device may select appropriate segments dynamically based on a variety of factors, such as network conditions, device capability, and user choice. Adaptive streaming may include various technologies or standards implemented or being developed, such as Dynamic Adaptive Streaming over Hypertext Transfer Protocol (HTTP) (DASH), HTTP Live Streaming or Internet Information Services (IIS) Smooth Streaming. For example, the user device may select a segment with the highest quality (e.g., resolution or bit-rate) possible that can be downloaded in time for playback without causing stalling or rebuffering events in the playback. Thus, the user device may seamlessly adapt its media content playback to changing network conditions. To prevent tampering or attacks to a media content, segments of the media content need to protected via authentication schemes. Various attacks (e.g., replication attacks with segments from unexpected representations) may need to be prevented, even when those segments are correct in terms of source and scheduling/timing.

SUMMARY in one embodiment, the disclosure includes a method including generating a segment signature for a segment of a media content based on the segment, trusted information contained in a media presentation description (MPD), and a signature signing key, wherein the MPD describes the media content, wherein the segment signature is independent of other segment signatures corresponding to other segments of the media content, and wherein a single copy of the segment signature is configured to be transmitted to a client requesting the segment of the media content thereby permitting the client to determine authenticity of the segment without receiving any additional segment signatures.

In an embodiment, the segment and the trusted information contained in the MPD are used to compute a hash value, and wherein the hash value and the signature signing key are used to generate the segment signature. In an embodiment, the trusted information contained in the MPD comprises a segment signature uniform resource locator (URL), and wherein a storage location of the segment signature is retrievable using the segment signature URL. In an embodiment, the trusted information contained in the MPD comprises a segment uniform resource locator (URL), and wherein a storage location of the segment is retrievable using the segment URL.

In an embodiment, the trusted information contained in the MPD comprises a segment signature uniform resource locator (URL) template, wherein the segment signature URL template is used to derive a segment signature URL, wherein the segment signature URL and the segment are used to compute a hash value, and wherein the hash value and the signature signing key are used to generate the segment signature. In an embodiment, the URL template comprises a segment signature URL template. In an embodiment, the URL template comprises a segment URL template. In an embodiment, the trusted information contained in the MPD comprises a content identification (CID), and wherein the CID is a characteristic of the segment. In an embodiment, the trusted information contained in the MPD is authenticated by a MPD signature of the MPD.

In another embodiment, the disclosure includes an apparatus including a processor configured to compute a segment signature for a segment of a media content based on the segment, a signature signing key, and trusted information contained in a media presentation description (MPD), wherein the MPD describes the media content, a receiver configured to receive a request for the MPD, and a transmitter configured to transmit the MPD and to transmit a single copy of the segment signature to a client requesting the segment of the media content thereby permitting the client to determine authenticity of the segment without receiving any additional segment signatures.

In an embodiment, the segment and the trusted information contained in the MPD are used to compute a hash value, and wherein the hash value and the signature signing key are used to generate the segment signature. In an embodiment, the trusted information contained in the MPD comprises a segment signature uniform resource locator (URL), and wherein a storage location of the segment signature is retrievable using the segment signature URL. In an embodiment, the trusted information contained in the MPD comprises a segment uniform resource locator (URL), and wherein a storage location of the segment is retrievable using the segment URL. In an embodiment, the trusted information contained in the MPD comprises a segment signature uniform resource locator (URL) template, wherein the segment signature URL template is used to derive a segment signature URL. In an embodiment, the processor is further configured to authenticate the trusted information contained in the MPD by computing a MPD signature. In an embodiment, the URL template comprises a segment signature URL template. In an embodiment, the URL template comprises a segment URL template.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
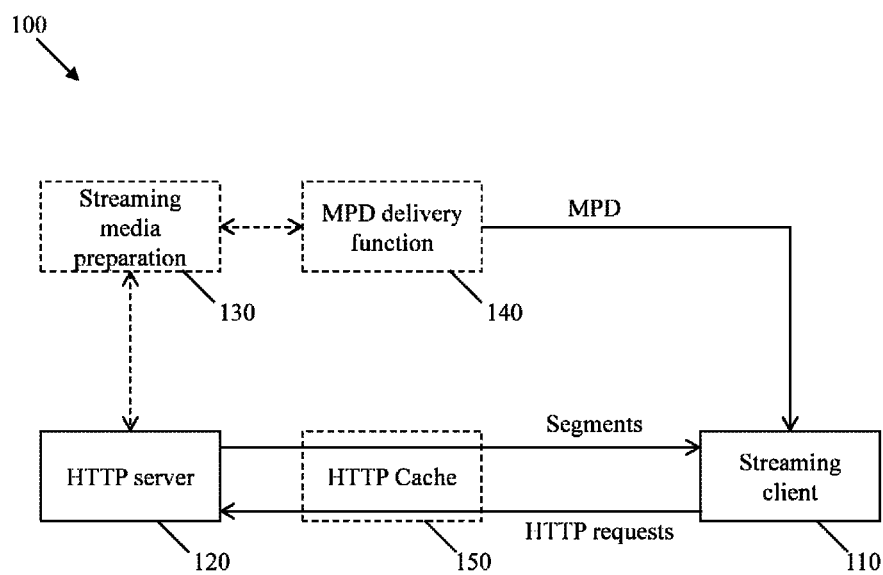
FIG. 1 is a schematic diagram of an embodiment of a media streaming scheme.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In adaptive streaming techniques such as Moving Picture Experts Group (MPEG)-DASH standard, due to the implementation of an adaptation strategy, two segments consecutively received by a DASH client may belong to two different representations. In use, the dynamic adaptation to determine Which representation a next segment should belong to may increase the complexity and difficulty of segment authentication, because the DASH client may not pre-determine which authentication message it needs and may have to get all authentication messages in advance. Some existing authentication schemes have focused on the general elements and framework, and some may obtain security at the cost of high calculations and communications.

Existing segment authentication schemes may not require any trusted information when using a signing function to compute or generate segment signatures. One example is the segment authentication scheme specified in a draft standard numbered ISO/IEC 23009-4 and entitled "Dynamic Adaptive Streaming over HTTP (DASH)—Part 4: Segment Encryption and Authentication", where ISO/IEC stands for the International Organization for Standardization (ISO)/International Electrotechnical Commission (IEC). Consequently, the media content may be vulnerable to tampering or malicious attacks, such as removal, addition, replacement, and/or re-ordering of segments. For example, during dynamic adaptation of streaming segments, an attacker may replace an original/authorized segment with an unauthorized segment, and replace an original signature for the original segment with an unauthorized signature for the unauthorized segment. A DASH client may not detect this attack, since the attacker may forge the unauthorized signature using the signing function.

Disclosed herein are systems, apparatuses, and methods for improved authentication of segments during adaptive streaming. In a disclosed authentication scheme, computation or generation of a segment signature may require not only a segment itself but also trusted information contained in the MPD. The authentication scheme binds the segment with the trusted information so that segment signatures may not be forged and various attacks may be prevented. Information used to generate the segment signature may be a segment signature URL, a segment URL, a content identification (CID), any other trusted information, or any combination thereof. Any tampering of the trusted information may be detected, since the integrity or authenticity of the trusted information may be guaranteed by signing a portion or all of the MPD to create a MPD signature. The disclosed authentication scheme may provide stronger security than existing schemes, while avoiding any increase in storage and communication costs.

FIG. 1 illustrates an embodiment of a media streaming scheme 100, which may be implemented to deliver media content from an HTTP server 120 to a streaming client 110. For example, the streaming scheme 100 may be a DASH or other type of streaming scheme. The streaming client 110 may be a program or application implemented in an operating system of a user device, or it may be a web client accessed in a web platform. The media content stored in the HTTP server 120 may be generated or prepared by a streaming media preparation unit 130. The media preparation unit 130 may be located in the HTTP server 120 or elsewhere (e.g., in a content provider). The HTTP server 120 may be part of a content provider or may be a node in a content distribution network (CDN). The media content may be generated by the content provider and then transmitted to a CDN node. The media content in the HTTP server 120 may comprise a MPD and a plurality of segments. Note that, if desired, the MPD and the segments may be stored in different servers and sent to the streaming client 110 from different servers. In addition, a HTTP server described herein merely serves as an example of server, it should be understood that thus embodiments disclosed herein may also be implemented in any other suitable type of server.

In the streaming scheme 100, the streaming client 110 may send a request to the HTTP server 120 for media content. In response, the HTTP server 120 may first use a MPD delivery function 140 to deliver a MPD to the streaming client 110. The MPD can be delivered using HTTP, email, thumb drive, broadcast, or any other transport. By parsing the MPD, the streaming client 110 may learn information regarding the media content, such as the timing of the program, the availability of media content, the media types, resolutions, minimum and maximum bandwidths, the existence of various encoded alternatives of multimedia components, the accessibility features and the required digital right management (DRM), the location of each media component on the network, and other characteristic of the media content. Using this information, the streaming client 110 may select the appropriate encoded representation or alternative and start streaming of the media content by fetching segments using HTTP GET requests. The HTTP server 120 may use a segment delivery function to deliver the segments to the streaming client 110. Note that the streaming client 110 may download segments from a plurality of HTTP servers, e.g., to maximize usage of network bandwidth. The streaming client 110 may render the downloaded media appropriately so as to provide streaming service to a user of the streaming client 110. Although the streaming client 110 may obtain the segments based on locations specified by URLs contained in the MPD, sometimes the segment may be stored in a HTTP cache 150 (e.g., in the HTTP server 120 or a CDN node), so that the streaming client 110 may receive them more efficiently.

After appropriate buffering to allow for network throughput variations, the streaming client 110 may continue to download subsequent segments while monitoring bandwidth fluctuations of the network. Depending on its measurements, the streaming client 110 may adaptively adjust streaming to the available bandwidth by downloading segments of different representations (e.g., with a lower or higher bit-rate) to maintain an adequate buffer.

Figure 2:
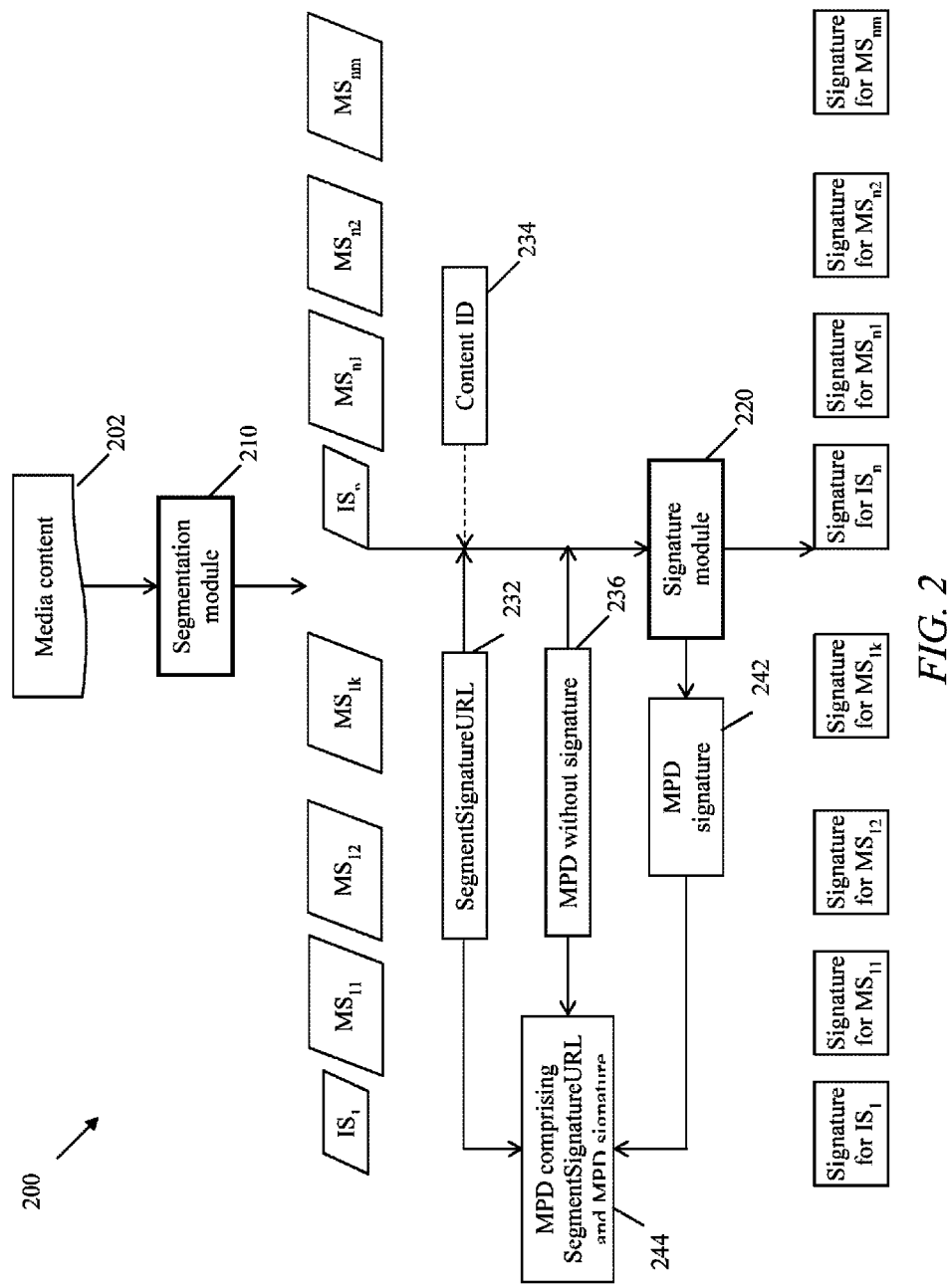
FIG. 2 is a schematic diagram of an embodiment of a scheme for generation of segments and their respective signatures.

FIG. 2 illustrates an embodiment of a scheme 200 for generation of segments and their respective signatures. The scheme 200 may be implemented by a HTTP server (e.g., the IMP server 120) or by a media content provider. A segmentation unit or module 210 may be configured to divide the media content 202 into a plurality of segments. As mentioned previously, depending on the application, various hierarchies may be used to represent the media content, if sub-segments are used, schemes described herein may apply to the sub-segment just as they apply to a segment.

Each representation may comprise a plurality of segments including an initialization segment (IS) and at least one media segment (MS). For example, as shown in FIG. 2, representation n, where n is an integer denoting an representation index, comprises one initialization segment (denoted as $IS_n$) and in media segments (denoted as $MS_{n1}$, $MS_{n2}$, . . . , $MS_{nm}$), where m is an integer denoting a segment index. Each representation may comprise an equal or different number of segments. For example, in FIG. 2 representation 1 comprises k segments, while representation n comprises in segments, where k and n can be the same or different.

To prevent tampering or unauthorized manipulation of the segments, each segment or sub-segment (if sub-segments are used) may be assigned a segment signature (sometimes referred to as a private key). Each segment may be retrievable via a segment URL, denoted as SegmentURL, and its corresponding signature retrievable via a segment signature URL, denoted as SegmentSignatureURL. Both segmentURL and SegmentSignatureURL may be stored as elements or attributes of the MPD. The MPD may contain the URLs instead of segment signatures directly as to reduce file size of the MPD.

A signature module 220 may be configured to generate a segment signature for each segment. For example, as shown in FIG. 2, a signature $IS_n$ is generated for the segment $IS_n$, a signature $MS_{n1}$ for the segment $MS_{n1}$, . . . , and a signature MS for the segment $MS_{nm}$. Consider the segment $IS_n$ as an example, with the premise that other segments may be signed similarly. In an embodiment, computing a segment signature for $IS_n$ takes into account not only $IS_n$ itself but also information contained in the MPD that are relevant to $IS_n$, such as a segmentURL, a SegmentSignatureURL, a content ID, or a time stamp, or any combination thereof. As shown in FIG. 2, the signature $IS_n$ may be computed based on $IS_n$, a SegmentSignatureURL 232, and a CID 234. The signature $IS_n$ may be computed further based on a MPD without signature 236 and a signature signing key. By binding a segment signature with the MPD, the authenticity of each segment may be ensured.

The MPD for the media content 202 may comprise elements and attributes programmed to describe information regarding the media content. In XML programming, an element may comprise three parts including a start tag indicated by <element name>, an element content, and an end tag indicated by </element name>. Further, an element may contain one or more attributes and/or child elements. An attribute may comprise an attribute name and an attribute value, which are expressed as attribute name=attribute value.

For each segment, a SegmentSignatureURL may be created as an attribute in the MPD. The SegmentSignatureURL specifies where a verifying entity (e.g., the streaming client 110) may obtain a segment signature for a given segment. For example, the segment signatures may be located in a signature storage server, thus the verifying entity may retrieve the segment signature there. In an embodiment, the signature module 220 may generate a signature object as follows:

$$\text{SegmentSignature=Sign(Hash(segment,SegmentSignatureURL),SignatureSignKey)} \quad (1)$$

where Hash( ) denotes a hash function of the segment and its SegmentSignatureURL, SignatureSignKey denotes a signature signing key, and Sign( ) denotes a signing algorithm using variables Hash( ) and SignatureSignKey.

By calculating the hash function, i.e., Hash( ), a digest or a hash value is created for a segment. Then, the corresponding segment signature is generated using the Sign( ) function. In an embodiment, calculation of the digest using the hash function may also take into account a CID of the segment. In this case, the segment signature may be generated as follows:

$$\text{SegmentSignature=Sign(Hash(segment,SegmentSignatureURL,CID),SignatureSignKey)} \quad (2)$$

In equation (1) or (2), the segment may be retrievable via its SegmentURL stored in the MPD. Note that, instead of specifying each SegmentURL the MPD may use a template (denoted as SegmentURLTemplate) at the beginning of a representation or an adaptation set to specify how each SegmentURL may be derived using the template. For example, the template may specify a time range and/or a byte range of each segment, thus when a DASH client requests a particular time range, a HTTP server may use the template to determine which segment to provide to the DASH client. Similarly, each SegmentSignatureURL may be stored in the MPD, or they may be derived from a URL template denoted as SignatureURLTemplate. The signature signing key (i.e., SignatureSignKey) may be a private key generated by a signing entity (e.g., the HTTP server 120 or a content provider). The signature signing key is be protected by the signing entity and not revealed to any third-party or user.

A corresponding signature verification key, denoted as SignatureVeriKey, may be generated based on the signature signing key. The signature verification key may be made public, e.g., distributed to third-parties and users, and stored in a signature storage server. SignatureVeriKey is retrievable or addressable via a signature verification key URL, denoted as SignatureVeriKeyURL. The SignatureVeriKeyURL may be stored as an attribute in the MPD to indicate where the verifying entity may locate the SignatureVeriKey. In an embodiment, both SignatureVeriKeyURL and SegmentSignatureURLTemplateas may be contained as attributes of an element denoted as SegmentSignature. The semantics of the element SegmentSignature is shown in Table 1, where symbol denotes an attribute, and O indicates that the related attribute is an optional attribute.

TABLE 1

Semantics for element SegmentSignature in the MPD.

| Element or Attribute Name | Use | Description |
| --- | --- | --- |
| SegmentSignature | | |
| @SegmentsignatureURLTemplate | O | Specifies a template to create a URL for retrieving each segment signature value. |
| @SignatureVeriKeyURL | O | Specifies a URL for retrieving a signature verification key. |

It should be noted that multiple segments in the media content 202 may share a common signature verification key. Consequently, it may be unnecessary to create an attribute SignatureVeriKeyURL for each segment. Instead, SignatureVeriKeyURL, may be created at a higher level according to the hierarchy of the media content 202. For example, it is possible that only one SignatureVeriKeyURL may be needed for an adaptation set, a period, a representation, or the whole media content. Alternatively, the one or more signature verification keys needed for the media content 202 may be directly stored in the MPD, in which case the attribute SignatureVeriKeyURL may be removed. Since a number of signature verification keys may be relatively small (e.g., 1), the MPD file size may not suffer much from direct inclusion of the signature verification keys.

The signature module 220 may be further configured to generate a MPD signature 242 to ensure the integrity and authenticity of information accounted in the computation of segment signatures. Computation of the MPD signature 242 may use any appropriate function or algorithm. Then, the MPD signature may be inserted into the MPD to produce a MPD 244 containing the MPD signature 242 and SegmentSignatureURL 232. In an embodiment, the MPD signature 242 may be stored as an element (e.g., denoted as Signature). For example, the MPD signature may make sure that certain information in the element SegmentSignature (e.g. attribute SegmentSignatureURLTemplate) are not tampered. Upon receiving of the MPD 244, the verifying entity may detect if a segment is replaced, modified, or removed.

Table 2 shows an examplary MPD comprising an element for a period and another element for a MPD signature. The examplary MPD is written as XML code. One in the art will recognize the notations and examplary element/attribute names and values, thus these details will not be further described in the interest of conciseness.

TABLE 2

An examplary MPD with MPD signature and segment signature elements.

```
<?xml version="1.0" encoding="UTF-8"?>
<MPD
    xmlns:xsi="http://www.w3.org/2001/XMLSchema-instance"
    xmlns="urn:mpeg:DASH:schema:MPD:2011"
    xmlns:drm="http://example.net/052011/drm"
    xmlns:sea="urn:mpeg:DASH:scherna:sea:2012 sea.xsd"
    ......
    <BaseURL>http://cdn.example.com/movie23453235/</BaseURL>
    <Period>
        <!-- Video protected with a specified license -->
        <AdaptationSet mimeType="video/mp4" codecs="avc1"
            subsegmentAlignment="true" subsegmentStartsWithSAP="2">
            ......
            <BaseURL>video/</BaseURL>
            <Representation id="6" bandwidth="256000" width="320" height="240">
                <BaseURL>video256.mp4</BaseURL>
            </Representation>
            <Representation id="7" bandwidth="512000" width="320" height="240">
                <BaseURL>video512.mp4</BaseURL>
            </Representation>
            <Representation id="8" bandwidth="1024000" width="640" height="480">
                <BaseURL>video1024.mp4</BaseURL>
            </Representation>
        </AdaptationSet>
        <!------Signature is available for all (sub)segments -->
        <sea:ContentAuthentication schemeIdUri="urn:mpeg:dash:sea:dsa">
            <sea:ContentSignature
                SignatureURLTemplate="https://verify.example.com?base=$base$&range=
```

TABLE 2-continued

An examplary MPD with MPD signature and segment signature elements.

```
$first$-$last$"/>
      </sea:ContentAuthentication>
    </Period>
  <Signature xmlns="http://www.w3.org/2000/09/xmldsig#">
    ......
      <SignatureValue>i6watmQQQly3GB+VsWq5fJKzQcBB4jRfH1bfJFj0JtFVtLotttzYyA==</
    Si
gnatureValue>
    ......
    </Signature>
</MPD>
```

Figure 3:
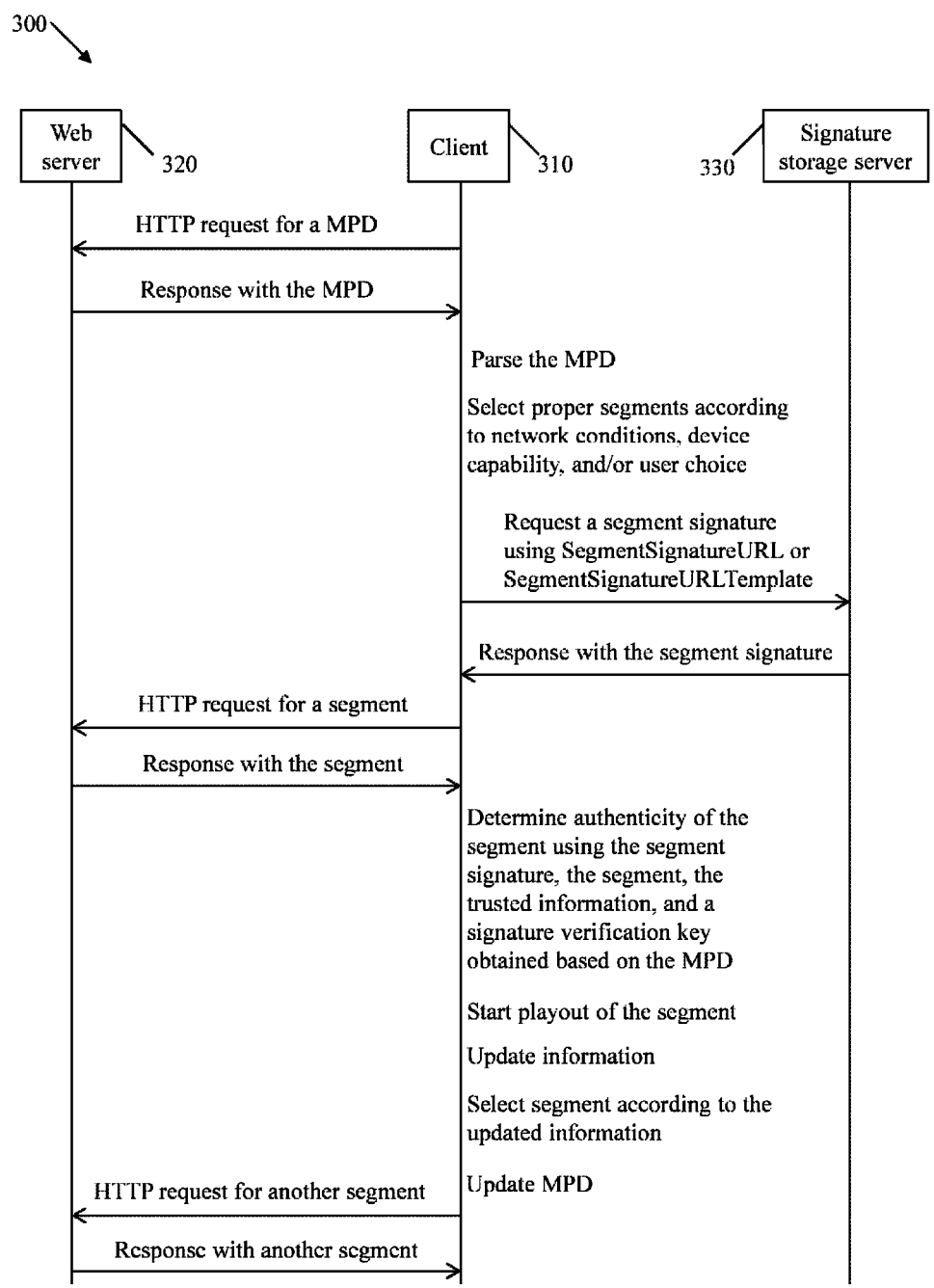
FIG. 3 is a message exchange diagram for an embodiment of a signature verification scheme.

FIG. 3 illustrates message exchanges in an embodiment of a signature verification scheme 300. To initiate streaming of a media content, a media streaming client 310, which may be a DASH client or another type of streaming client, first sends a request for a MPD to a web server 320, which may be the same or similar to the HTTP server 120. Then, the web server 320 may respond by sending back the MPD. After receiving the MPD, the client 310 may parse the MPD to interpret information contained in the MPD. The client 310 may determine an appropriate representation or adaptation set according to resource statistics, network environment or conditions, device capability of the client 310, and the choice of the subscriber using the client 310.

Next, the client 310 may send requests for segments including initialization segments and media segments, and the web server 320 may respond by transmitting the segments. A request transmitted by the client 310 may comprise a SegmentURL, which is used to retrieve a segment in the web server 320. Although the MPD and the segments are transmitted from the same web server 320, one skilled in the art will recognize that, in alternative embodiments, a MPD describing a media content and segments of the media content may be stored in different servers and transmitted from different servers. For example, the MPD may be transmitted from a content distributor, while the segments from a third-party CDN node.

The client 310 is configured to support segment signature verification. In order to verify whether the received segment is authentic, the client 310 may send a request to a signature storage server 330, where an original SegmentSignature is stored. Note that the original SegmentSignature may have been generated by the HTTP server 320. The client 310 may obtain the original SegmentSignature by using SegmentSignatureURL or by using SegmentSignatureURLTemplate contained in the received MPD. Thus, only one SegmentSignature may need to be stored for one segment, which results in high storage efficiency, and only one SegmentSignature may need to be delivered to the client 310, which minimizes communication data. Further, to minimize any delay the signature verification process may bring, the client 310 may obtain the original segment signature before or while receiving a corresponding segment.

Additionally, after receiving a segment, the client 310 may determine authenticity of the segment using the segment signature, the segment, the trusted information, and a signature verification key obtained based on the MPD. In an embodiment, the client 310 may compute a digest using a hash function of the received segment as follows:

$$\text{Hash(received segment,SegmentSignatureURL)} \quad (3)$$

In an alternative embodiment, calculation of the digest using the hash function may also take into account the CID of the segment. In this case, the digest may be generated as follows:

$$\text{Hash(received segment,SegmentSignatureURL,CID)} \quad (4)$$

It can be seen that equation (3) corresponds to equation (1) and equation (4) corresponds to equation (2), thus generating a digest in the client 310 should use the same Hash( ) function as the one used in generating the original SegmentSignature. In formula (3) or (4), the SegmentSignatureURL may be extracted from the received MPD or derived from SegmentSignatureURLTemplate contained in the received MPD.

In determining authenticity of the received segment, the client 310 may also compute the value of Segment Signature using the signature verification key (i.e., SignatureVeriKey) to get a result. Then, the client 310 may compare the result with the digest or hash value. If they are equal, the authenticity verification passes, indicating that the received segment is the authentic segment; otherwise the verification fails, indicating that the segment and/or the segment signature may have been tempered. Then, the client 310 may take actions according to the verification result and pre-defined rules.

The SignatureVeriKey may be obtained by using SignatureVeriKeyURL in the received MPD. For example, the client 310 may use SignatureVeriKeyURL to retrieve SignatureVeriKey stored in the signature storage server 330. Alternatively, if the received MPD includes SignatureVeriKey instead of SignatureVeriKeyURL, then SignatureVeriKey may be extracted directly. As mentioned above, multiple segments in a media content may share a common signature verification key. Thus, the SignatureVeriKey may not need to be repeatedly acquired for each segment. If all segments share the same SignatureVeriKey, it only needs to be acquired by SignatureVeriKeyURL once.

In use, to save processing time and/or power, the client 310 may elect to verify signatures for only a portion of the segments contained in a streaming media. For example, the client 310 may decide to randomly pick some segments to verify their segment signatures.

Provided with successful verification of a segment, the client 310 may start playout of the segment. As the client 310 plays verified segments, it may also update resource statistics (e.g., network condition, subscriber choice, device capability). If according to the updated resource statistics, a different representation should be used, the client 310 may start requesting segments in the different representation. Further, the MPD may be updated to incorporate updated information. If necessary, the client 310 may request for the updated MPD again.

When analyzing the security of the disclosed signature verification schemes, it should be understood that their security may depend on the security of the signing function/algorithm (e.g., equations (1)-(2)) and confidentiality of the signing key used in generating the original SegmentSignature. Thus, it may be assumed that an attacker does not have access to the original segment signatures, and is incapable of correctly generating the original segment signature without knowing all input information (e.g., the segment, the SegmentSignatureURL, the SignatureSignKey, and optionally the CID). Additionally, if the hash function is robust to collision attacks, it will be difficult for the attacker to find two different segments that have the same hash digest (i.e., signature digest). As a result, the attacker may not be able to find another segment which has the same hash digest as the digest of the segment signed by the rightful signer. In other words, the attacker may be incapable of forging a segment signature.

In use, the client 310 may get both a segment and its signature from locations specified by segmentURL and SegmentSignatureURL respectively. To increase efficiency, sometimes the client 310 may get the segment and its signature from a CDN cache or a HTTP cache. Since the CDN node or HTTP server may tamper with the segment and/or its signature, the segment and/or its signature received by the client 310 may be different than the original ones due to tampering. Therefore, it may be necessary to ensure that segment and its signature are from the authentic entity (e.g., rightful media content provider). In this disclosure, a segment signature may be generated based on not only the segment itself but also trusted information in the MPD, such as its SegmentSignatureURL. Further, the authenticity of SignatureURL may be verified by the MPD signature. Thus, the client 310 may confirm the authenticity and integrity of each segment, and segment tampering attacks may be detected. The authenticity of the MPD may be ensured via any technique, e.g., the technique specified by the World Wide Web Consortium (W3C) standard.

If the MPD is not signed, e.g., not having the MPD signature, certain information in the MPD, such as SegmentSignatureURL, may then be tampered without being detected by the DASH client. Assume, for example, that the rightful media content is a COCA-COLA advertisement, and an attacker attempts to replace it with a PEPSI advertisement. The COCA-COLA and PEPSI advertisements may be served by the same media content provider. In the MPD, the attacker may replace a SegmentSignatureURL corresponding to a COCA-COLA segment with a SegmentSignatureURL corresponding to a PEPSI segment. Further, in the HTTP server or a cache, the attacker may replace the COCA-COLA segment with the PEPSI segment. Since the attacker may have access to the hash functionas the DASH client does, the attacker may generate a hash value for the PEPSI segment based on the PEPSI segment and the signature verification key. Then, the attacker may store the SegmentSignature at any location that is addressable by the SegmentSignatureURL corresponding to the PEPSI segment. In this case, after the PEPSI segment is received by the DASH client, a hash value may be computed based on the PEPSI segment and its SegmentSignatureURL. The DASH client may also compute another value using the received segment and a signature verification key. The two values would match, thus the DASH client may not be able to detect the tampering and become valuable to tampering attacks.

As mentioned previously, when generating a signature for a segment, the disclosed schemes takes into account trusted information in the MPD, thereby ensuring authenticity of the statement. The trusted information may be diverse and exclusive for each segment. For example, the trusted information may be the SegmentSignatureURL, SegmentURL, or CID. The disclosed schemes may prevent various attack scenarios. In a first examplary case, an original segment is replaced by an unauthorized segment, which is then received by the DASH client. In this case, the DASH client may detect the authorized segment. The DASH client may use the SegmentSignatureURL (trusted information) to locate an original SegmentSignature for the original signature, which was generated as follows:

$$\text{Original SegmentSignature} = \text{Sign}(\text{Hash}(\text{original segment}, \text{SegmentSignatureURL}), \text{SignatureSignKey}) \quad (5)$$

The DASH client may further convert the original segment signature to another value using any appropriate function for verification purposes. As described previously, SignatureSignKey determines a corresponding SignatureVeriKey. Thus, the DASH client may compute a hash value as follows:

$$\text{Hash}(\text{unauthorized segment}, \text{SegmentSignatureURL}) \quad (6)$$

By comparing a value based on the original segment signature and another value based on the received segment, the DASH client will detect that verification fails, because the original and unauthorized segments are different.

In a second examplary case, the original SegmentSignature is replaced by an unauthorized SegmentSignature, which may be stored in a signature storage server. In this case, after receiving the original segment, the DASH client may use the SegmentSignatureURL (trusted information) to locate the unauthorized SegmentSignature (since it replaced the original SegmentSignature). The client may further convert the unauthorized SegmentSignature to another value as necessary. Further, the DASH client may compute a hash value as follows:

$$\text{Hash}(\text{original segment}, \text{SegmentSignatureURL}) \quad (7)$$

By comparing the hash value and another value based on the unauthorized SegmentSignature, the DASH client will detect that verification fails.

In a third examplary case, the original segment is replaced by the unauthorized segment, and the original SegmentSignature replaced by the unauthorized SegmentSignature. Note that since the SegmentSignatureURL MPD is trusted information and the signature signing key is protected, the attacker will not be able to calculate the unauthorized SegmentSignature using a signing function. In this case, after receiving the unauthorized segment, the DASH client may generate a hash value following equation (6). Further, the DASH client may use the SegmentSignatureURL (trusted information) to locate the unauthorized SegmentSignature (since it replaced the original SegmentSignature). The DASH client may further convert the unauthorized SegmentSignature to another value as necessary. By comparing values based on the received segment and the unauthorized SegmentSignature, the DASH client will detect that verification fails. Then, the DASH client may take actions according to the verification result and pre-defined rules.

The disclosed signing schemes may have stronger security than conventional signing schemes, since if no trusted information in the MPD is considered when generating the segment signature, some attacks are possible. Consider the third examplary case in a conventional scheme. Since generation of a SegmentSignature does not account for any information in the MPD, the attacker will be able to calculate the unauthorized SegmentSignature based on the unauthorized segment using a signing function. Consequently, when the DASH client generate a retrieved SegmentSignature based on only the received unauthorized segment, the retrieved SegmentSignature may match the unauthorized SegmentSignature.

In the conventional scheme, adding a CID in the segment signature may not prevent this attack, since the attacker may re-order or skip some segments to launch the attack. Similarly, adding a time stamp in the segment signature may also not prevent the attack either, since the attacker may replace the original segment with a concurrent unauthorized segment belonging to a concurrent unauthorized media content. Moreover, adding both the CID and time stamp in the segment signature may not prevent the attack either, since the time stamp is a time window, and the attacker may replace the original segment with neighboring segments (e.g., a previous segment or a next segment in the same representation). In addition, the attacker may also replace the original segment with a corresponding segment in another representation or adaptation set. In addition, it is may be undesirable to contain a time stamp in a segment signature, since the time stamp may only work for live streaming in which one segment has one time stamp. If the segment is not part of a live streaming media, multiple time stamps may be generated for the segment, since different DASH clients may accesses the same segment at different time. In this case, if the segment signature contains the time stamp, multiple segment signatures and multiple SegmentSignatureURLs may be necessary, which may lead to an extra burden to the DASH system.

In practice, even though delivery of URL may be implemented using secure channels, for example, using the HTTP Secure (HTTPS) communications protocol, the secure channels may bring downsides as well. For example, since the URLs may need to be encrypted when sending in the secure channels, a receiving end such as a CDN node may not cache them correctly. For another example, delivery of information via HTTPS may be more expensive and less efficient, as the information needs to be encrypted and then decrypted. The disclosed authentication schemes may not require the URLs to be delivered via secure channels, which may prove advantageous in practice.

Figure 4:
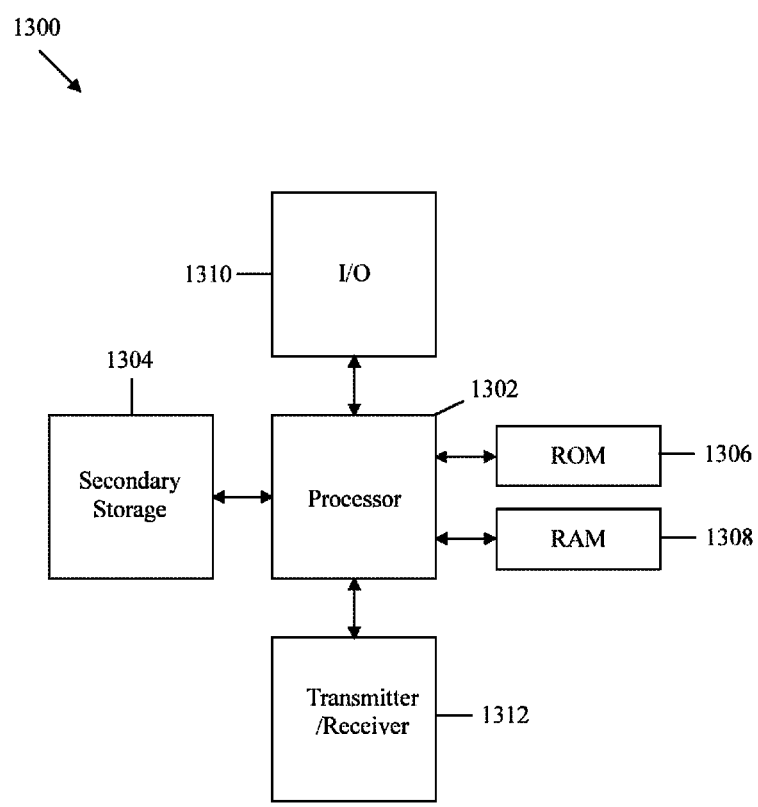
FIG. 4 is a schematic diagram embodiment of a network node.

The schemes described above may be implemented on a network component or node, such as a network node with sufficient processing power, memory resources, and network throughput capability to handle the necessary workload placed upon it. FIG. 4 illustrates an embodiment of a network node 1300 suitable for implementing one or more embodiments of the methods/schemes disclosed herein, such as the media streaming scheme 100, the scheme 200, and the signature verification scheme 300. Further, the network node 1300 may be configured to implement any of the apparatuses described herein, such as the streaming client 110 or 320, the HTTP/web server 120 or 320, a media content provider, or the signature storage server 330.

The network node 1300 includes a processor 1302 that is in communication with memory devices including secondary storage 1304, read only memory (ROM) 1306, random access memory (RAM) 1308, input/output (I/O) devices 1310, and transmitter/receiver 1312. Although illustrated as a single processor, the processor 1302 is not so limited and may comprise multiple processors. The processor 1302 may be implemented as one or more central processor unit (CPU) chips, cores (e.g., a multi-core processor), field-programmable gate arrays (FPGAs), application specific integrated circuits (ASICs), and/or digital signal processors (DSPs), and/or may be part of one or more ASICs. The processor 1302 may be configured to implement any of the schemes described herein, including the streaming scheme 100, the scheme 200, and the signature verification scheme 300. The processor 1302 may be implemented using hardware or a combination of hardware and software.

The secondary storage 1304 is typically comprised of one or more disk drives or tape drives and is used for non-volatile storage of data and as an over-flow data storage device if the RAM 1308 is not large enough to hold all working data. The secondary storage 1304 may be used to store programs that are loaded into the RAM 1308 when such programs are selected for execution. The ROM 1306 is used to store instructions and perhaps data that are read during program execution. The ROM 1306 is a non-volatile memory device that typically has a small memory capacity relative to the larger memory capacity of the secondary storage 1304. The RAM 1308 is used to store volatile data and perhaps to store instructions. Access to both the ROM 1306 and the RAM 1308 is typically faster than to the secondary storage 1304.

The transmitter/receiver 1312 may serve as an output and/or input device of the network node 1300. For example, if the transmitter/receiver 1312 is acting as a transmitter, it may transmit data out of the network node 1300. If the transmitter/receiver 1312 is acting as a receiver, it may receive data into the network node 1300. The transmitter/receiver 1312 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LIE), worldwide interoperability for microwave access WiMAX), and/or other air interface protocol radio transceiver cards, and other well-known network devices. The transmitter/receiver 1312 may enable the processor 1302 to communicate with an Internet or one or more intranets I/O devices 1310 may include a video monitor, liquid crystal display (LCD), touch screen display, or other type of video display for displaying video, and may also include a video recording device for capturing video. I/O devices 1310 may also include one or more keyboards, mice, or track balls, or other well-known input devices.

It is understood that by programming and/or loading executable instructions onto the network node 1300, at least one of the processor 1302, the secondary storage 1304, the RAM 1308, and the ROM 1306 are changed, transforming the network node 1300 in part into a particular machine or apparatus (e.g., a HTTP server or a DASH client having the novel functionality taught by the present disclosure). The executable instructions may be stored on the secondary storage 1304, the ROM 1306, and/or the RAM 1308 and loaded into the processor 1302 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by anew ASIC is a particular machine or apparatus, likewise a computer that has been programmed and/or loaded with executable instructions may be viewed as a particular machine or apparatus.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method comprising:
    generating a segment signature for a segment of a media content based on the segment, trusted information contained in a media presentation description (MPD) including a segment signature uniform resource locator (URL), and a signature signing key, wherein the segment signature URL and the segment are used to compute a hash value, and wherein the hash value and the signature signing key are used to generate the segment signature,
    wherein the MPD describes the media content,
    wherein the segment signature is independent of other segment signatures corresponding to other segments of the media content, and
    wherein a single copy of the segment signature is configured to be transmitted to a client requesting the segment of the media content thereby permitting the client to determine authenticity of the segment without receiving any additional segment signatures.

2. The method of claim 1, wherein a storage location of the segment signature is retrievable using the segment signature URL.

3. The method of claim 1, wherein the trusted information contained in the MPD comprises a segment URL, and wherein a storage location of the segment is retrievable using the segment URL.

4. The method of claim 1, wherein the trusted information contained in the MPD comprises a URL template, wherein the URL template is used to derive the segment signature URL.

5. The method of claim 4, wherein the URL template comprises a segment signature URL template.

6. The method of claim 4, wherein the URL template comprises a segment URL template.

7. The method of claim 1, wherein the trusted information contained in the MPD comprises a content identification (CID), and wherein the CID is a characteristic of the segment, and wherein the hash value is computed using the segment signature URL, the segment, and the CID.

8. The method of claim wherein the trusted information contained in the MPD is authenticated by a MPD signature of the MPD.

9. An apparatus comprising:
    a processor configured to compute a segment signature for a segment of a media content based on the segment, a signature signing key, and trusted information contained in a media presentation description (MPD) including the segment and a segment signature uniform resource locator (URL), wherein the MPD describes the media content, and wherein the segment signature URL and the segment are used to compute a hash value, and wherein the hash value and the signature signing key are used to generate the segment signature;
    a receiver configured to receive a request for the MPD; and
    a transmitter configured to transmit the MPD and to transmit a single copy of the segment signature to a client requesting the segment of the media content thereby permitting the client to determine authenticity of the segment without receiving any additional segment signatures.

10. The apparatus of claim 9, wherein a storage location of the segment signature is retrievable using the segment signature URL.

11. The apparatus of claim 9, wherein the trusted information contained in the MPD comprises a segment URL, and wherein a storage location of the segment is retrievable using the segment URL.

12. The apparatus of claim 9, wherein the trusted information contained in the MPD comprises a URL template, wherein the template is used to derive the segment signature URL.

13. The apparatus of claim 12, wherein the processor is further configured to authenticate the trusted information contained in the MPD by computing a MPD signature.

14. The apparatus of claim 12, wherein the URL template comprises a segment signature URL template.

15. The apparatus of claim 12, wherein the URL template comprises a segment URL template.

* * * * *

UNITED STATES PATENT AND TRADEMARK OFFICE
CERTIFICATE OF CORRECTION

| | |
|---|---|
| PATENT NO. | : 9,648,027 B2 |
| APPLICATION NO. | : 15/066759 |
| DATED | : May 9, 2017 |
| INVENTOR(S) | : Xin Wang et al. |

It is certified that error appears in the above-identified patent and that said Letters Patent is hereby corrected as shown below:

In the Claims
Column 16, Lines 28-30, Claim 8, should read:
8. The method of claim 1, wherein the trusted information contained in the MPD is authenticated by a MPD signature of the MPD.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*